US006751526B2

United States Patent
Fujita

(10) Patent No.: US 6,751,526 B2
(45) Date of Patent: *Jun. 15, 2004

(54) METHOD FOR DESCRIBING ROBOT STRUCTURE AND PART OF ROBOT

(75) Inventor: Masahiro Fujita, Saitama (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/135,973

(22) Filed: Aug. 18, 1998

(65) Prior Publication Data

US 2002/0062176 A1 May 23, 2002

(30) Foreign Application Priority Data

Aug. 22, 1997 (JP) .......................................... P9-226896

(51) Int. Cl.$^7$ ..................... G06F 19/00; G05B 19/04; A63H 3/28
(52) U.S. Cl. ..................... 700/245; 700/246; 700/247; 700/248; 446/297; 446/405; 446/268
(58) Field of Search ............................... 700/245, 246, 700/247, 248, 249, 250, 253, 257, 258, 261, 262, 263, 264, 297; 446/405, 268, 303, 397, 175, 406, 407, 473, 409

(56) References Cited

U.S. PATENT DOCUMENTS

| | | | |
|---|---|---|---|
| 3,703,048 A | * 11/1972 | Cooper ......................... 46/168 |
| 4,391,060 A | * 7/1983 | Nakane .......................... 46/22 |
| 4,682,969 A | * 7/1987 | Choy et al. .................. 446/279 |
| 4,765,609 A | * 8/1988 | Wilson et al. ................. 482/83 |
| 4,772,831 A | * 9/1988 | Casler, Jr. et al. ........... 378/568 |
| 5,073,140 A | * 12/1991 | Lebensfeld et al. ......... 446/297 |
| 5,469,512 A | 11/1995 | Fujita et al. ................. 382/118 |
| 5,766,077 A | * 6/1998 | Hongo .......................... 463/30 |
| 5,963,712 A | 10/1999 | Fujita et al. |

FOREIGN PATENT DOCUMENTS

| DE | 41 18 302 A1 | 12/1991 | |
|---|---|---|---|
| JP | 5-245784 | 9/1993 | ............ B25J/13/08 |
| JP | 9-19040 | 1/1997 | .......... H02G/15/08 |

OTHER PUBLICATIONS

"ROBOPT—Ein System zur Optimierung des Robotereinsatzes in Automatisierungssystemen," Walter Schwinn, 1993, pp. 386–394.

"Efficient computation algorithm for dynamic modelling of tree structure robot arms," Said M. Megahed, 1992, pp. 225–242.

"Optimal Synthesis of Robot Manipulators Based on Global Dynamic Parameters," J.R. Singh and J. Rastegar, 1992, pp. 538–548.

* cited by examiner

Primary Examiner—Tim Vo
(74) Attorney, Agent, or Firm—Bell, Boyd & Lloyd LLC

(57) ABSTRACT

A method for describing the structure of a robot representing robot parts as an assembly of elementary structures which is based on the skeletonic representation, a robot structure and a robot part. The parts CPCi are robot parts making up a robot. The connecting information CONNECTi is represented by a symbol "-" specifying serial connection to a previous elementary structure and a symbol ";n" specifying connection to the elementary structure n elementary structures before. The shape information jSHAPEi, is represented by straight lines by a vector $_jp_i$, and the coordinate transformation to the next elementary structure at the terminal point of iPARTj is given by the transformation matrix $_jR_i$.

18 Claims, 7 Drawing Sheets

METHOD FOR DESCRIBING ROBOT STRUCTURE AND PART OF ROBOT

BACKGROUND OF THE INVENTION

1. Field of the Invention

This invention relates to a method for describing the structure of a robot configured to command or control movement of a robot using a CPU, a robot device and a part of a robot.

2. Description of the Related Art

Many of robots are assembled to a pre-set shape by combining plural parts in a predetermined correlation and the various parts are driving-controlled to change the posture or movements.

For example, a robot disclosed in Japanese laying-Open Patent H-5-245784 is configured to be constructed to a desired shape by combining plural articulated modules and plural arm modules. This robot is configured so that a proper number is set for each articulated modules and a controller recognizes the connection sequence of each articulated module based on the proper number obtained by communication with each articulated module such that a control program can be rewritten to a suitable one based on this recognition.

There is also known a computer game in which a virtual robot or a virtual animal is moved on a computer by computer graphics (CG) and the behavior of the virtual robot or the virtual animal is changed responsive to the input information by a sensor connected to the computer.

There is also stated in many textbooks for robots a method for calculating the movement of a real robot in which, in doing simulation of the real robot, a model having the same shape and weight mass as those of the real robot is constructed on a computer and a force physically present in real world, such as the force of gravity, is applied thereto to find its movement by calculations.

Meanwhile, the robot disclosed in Japanese laying-Open patent H-5-245784 is presupposed on a manipulator and hence cannot cope with a structure in which parts are branched into two or more portions nor with the control which parts is based on the input information from various sensors. Thus, the present Assignee has proposed in Japanese laying-Open Patent H-9-19040 a robot apparatus made up of plural components, in which there are provided first storage means for storing the shape information for determining the shape of the parts, second storage means for storing the movement information required for describing movement of parts, third storage means for storing the information on characteristics of electronic parts housed in the parts and detection means for detecting the state of the respective parts. This robot apparatus also has control means capable of automatically recognizing the overall structure or movement characteristics of the parts based on the results of detection by detection means. In this robot apparatus, each storage means of each part is configured to store a conversion program used for converting first data represented by the predetermined data format set in common for each function of the electronic parts into second data represented by the data format used for each function of each electronic part by a control program used by control means for controlling the parts. The result is that each part can be designed without dependency on the data format pre-set by the control program.

By storing the shape or the function information in the robot parts and combining these parts by an information line system (serial bus) configured for allowing recognition of the sequence, it is possible for the CPU controlling the robot to know the robot shape, types and the mounting sites of the sensor and the actuator.

In the Japanese Laying-Open patent H-9-19040, there is realized a robot of one of a number of configurations having one of a variety of configurations of the mechanical system which automatically constructs a software object managing the information owned by robot components termed a virtual robot and the connection sequence from the information owned by the serial bus and the robot components for driving-controlling the robot and which controls the robot by a common control system using a command not dependent on the mechanical system.

SUMMARY OF THE INVENTION

It is an object of the present invention to provide a robot structure describing method for representing parts of a robot apparatus as an assembly of elementary structures basically consisting in the skeletonic representation.

It is another object of the present invention to provide a robot apparatus capable of operating as a robot having various functions of a structure represented by an assembly of elementary structures basically consisting in the skeletonic representation.

In one aspect, the present invention provides a method for describing a structure of a robot including resolving a robot part CPCi into J elementary structures PARTj, and specifying the structure of the robot by the connection information CONNECTi and the shape information jSHAPEi made up of a vector $_jp_i$ and a transformation matrix $_jR_i$. This allows representation of a robot structure by a set of elementary structures which is based on a skeletonic representation.

Preferably, the initial coordinate point of the next part is given by the terminal point of a connection plane of the part.

With the method for describing the robot structure of the present invention, the connection information CONNECTi, vector $_jp_i$ and the transformation matrix $_jR_i$ can be set rather freely. Even complex parts having various functions can be represented by defining that the functions exist at the beginning or end points of the vector $_jp_i$.

In another aspect, the present invention provides a robot apparatus including overall control means, and a plurality of parts CPC containing electronic parts including an actuator and/or a sensor for measuring a pre-set physical quantity, the overall control means doing overall recognition and control by the shape information for determining the shape of the part, the motion information necessary for stating the motion of the part, the information on characteristics of the electronic parts housed in the parts, and the connection information specifying the connection status of the parts, wherein parts CPCi are composed of J elementary structures PARTj and the connection information thereof, the connection information is CONNECTi, the shape information of the elementary structures PARTj is jSHAPEi, the dynamic information of the elementary structures PARTj is jDYNi and the functional information of the elementary structures PARTj is jFUNCi, and wherein the connecting information CONNECTi is represented by a symbol "-" specifying serial connection to a previous elementary structure and a symbol ";n" specifying connection to the elementary structure n elementary structures before, the shape information jSHAPEi is represented by a vector $_jp_i$ of a straight line and the coordinate transformation to the next elementary structure at an end point of iPARTj is given by the transformation matrix $_jR_i$, the dynamic information jDYNi is comprised of a vector $_jS_i$ to the center of mass $_jG_i$ of iPARTj represented by the coordinate system $_j\Sigma_i$ of iPARTj, an inertia matrix $_jI_i$, centered about mass $_jm_i$, $_jG_i$ and the information $_ja_i$ which gives the direction of motion at the beginning point of iPARTj, in which the torque and the direction in which is generated the function positioned at the beginning point is accorded by the function information jFUNCi of the elementary structures PARTj, the functional information jFUNCi is the connection information specifying the connection state of parts. By the overall control means doing overall recognition and control, the robot device can operate as a robot having various functions and also having a structure represented as a set of elementary structures which is based on skeletonic representation.

The robot part according to the present invention includes storage means for storing the information on physical characteristics of parts, and means for retrieving the information stored in the storage means.

DESCRIPTION OF THE PREFERRED EMBODIMENTS

Figure 1:
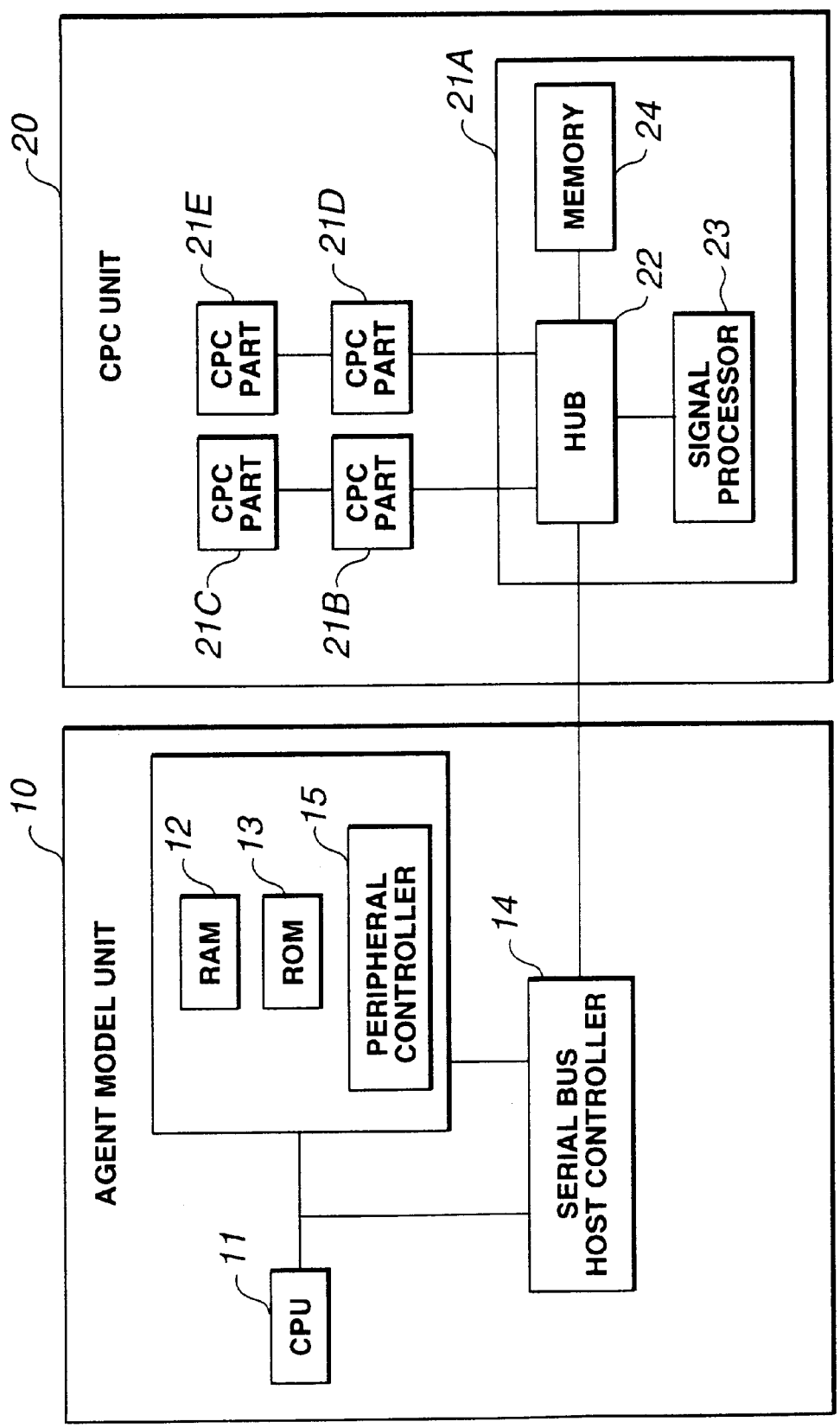
FIG. 1 is a block diagram showing an illustrative structure of a robot apparatus embodying the present invention.

Referring to the drawings, preferred embodiments of the present invention will be explained in detail.

FIG. 1 shows a schematic structure of the robot apparatus. The robot apparatus, shown in FIG. 1, is made up of an agent model unit 10 and a configurable physical component (CPC) unit 20. The agent model unit 10 is made up of a CPU 11, a RAM 12, a ROM 13, a host controller 14 of a serial bus and a general CPU peripheral device 15. Master input/output is by the host controller 14.

The CPC unit 20 is comprised of CPC parts 21A, 21B, 21C, 21D, 21E, . . . , interconnected as robot parts in a branched or combined tree structure. The robot parts, that is the CPC parts, are made up of HUB 22 for branching signal lines of the interconnected serial buses, a signal processor 23 and a memory 24 On the signal processor 23 for processing serial bus signals is a device side controller of the serial bus adapted for taking charge of clock synchronization, error detection, data packet re-transmission requests and address management. In the memory 24 are stored shape data of a robot part, physical data for setting a motion equation, the functional information owned by this part or a program transferred to and controlling the robot part. Responsive to the request from the agent model unit 10, these data and programs are transferred from the serial bus or a control command is entered.

Figure 2:
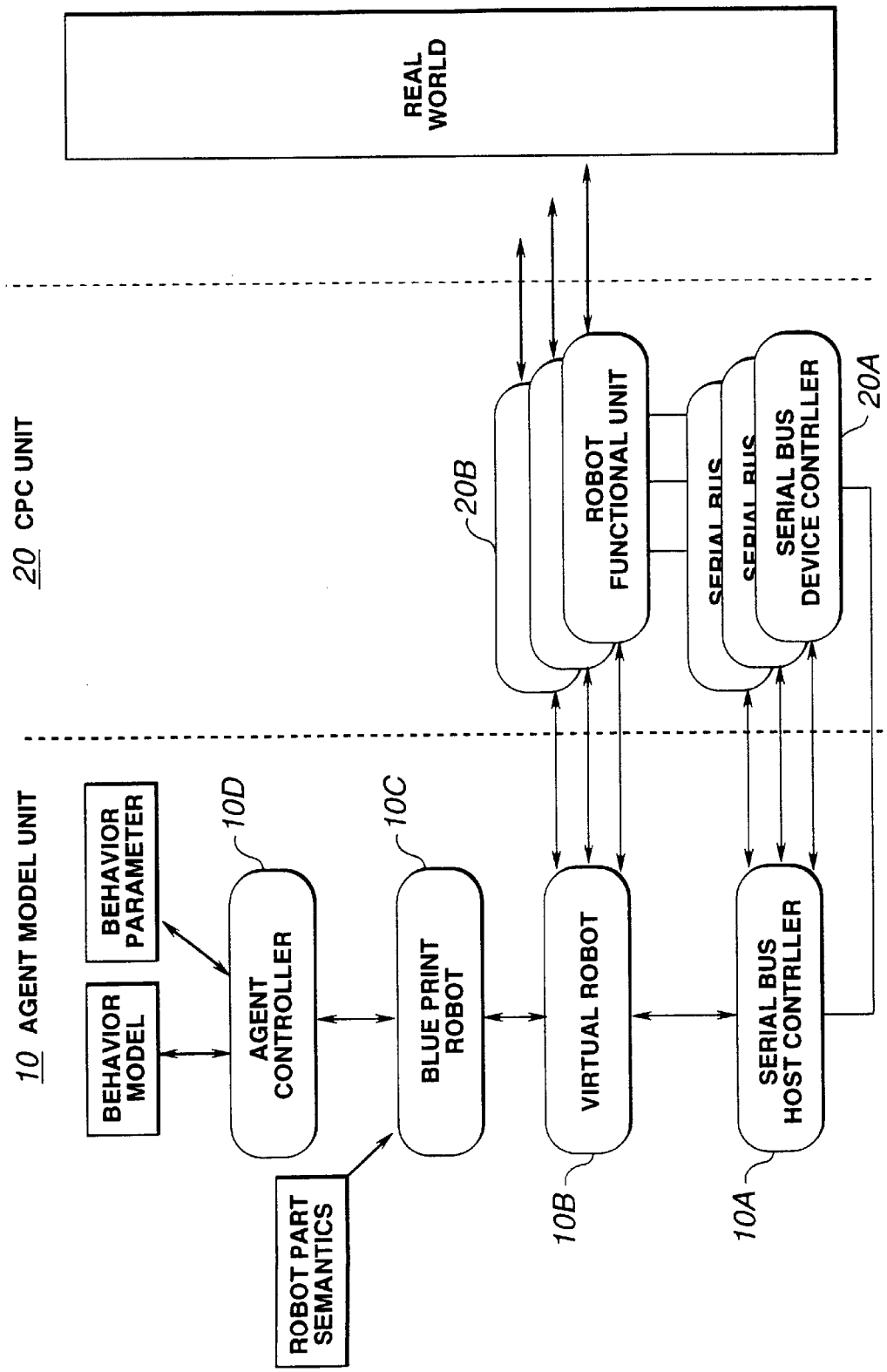
FIG. 2 shows the software configuration of the robot apparatus of FIG. 2 as split into functional structural units.

FIG. 2 shows the software configuration of the above robot device as split into functional structural units. Specifically, the agent model unit 10 of the robot apparatus is made up of a serial bus host controller 10A (software and hardware), controlling the serial bus, a virtual robot (software) supervising the information and connection of the CPC parts of the CPC unit, a blue-print robot (software) 10C which gives definition of the meaning in the robot of each CPC part in accordance with data of robot part semantics accorded by the user, and an agent controller 10D for doing sensor processing or behavior control in accordance with the behavioral model or the behavioral control in order to operate the blue-print robot 10C as an autonomous robot.

The CPC unit 20 functionally is constituted by a serial bus device controller 20A and a robot functional unit 20B. The serial bus device controller 20A processes signals entered from and outputted to the serial bus and functionally has protocol with the serial bus host controller 10A of the agent model unit 10 in order to do data exchange. The robot functional unit 20B operates in accordance with the data from the serial bus device controller 20A or commands from the agent model unit 10 and functionally has the protocol with the virtual robot 10B of the agent model unit 10 for doing data exchange.

In the above-described robot apparatus, the agent model unit 10 processes serial data input/output by the hardware of the serial bus host controller 10A and the software controlling it. That is, during data outputting, the serial bus host controller 10A appends a sync pattern for synchronization, header information, data, error detection and error correction codes and modulates the resulting data by NRZ prior to transmission. After data transmission, the serial bus host controller 10A receives e.g., ACK signals from the sender to confirm acquisition of the data before proceeding to the next data processing. During data inputting, the serial bus host controller 10A executes clock synchronization of the sent signal, sync pattern detection, header information processing, data acquisition, error detection and error correction to send ACK signals. If there is error in data, the serial bus host controller 10A sends a re-transmission request. The serial bus host controller 10A performs data inputting/outputting over a serial bus.

The sequence of of the CPC parts 21A, 21B, . . . of the CPC unit 20 may be known by exploiting the fact that the CPC parts are interconnected by a tree structure. Specifically, it is possible for the serial bus host controller 10A to know the connection sequence of the CPC parts 21A, 21B, . . . by the serial bus host controller 10A associating the address used for furnishing the information to the CPC parts with the branching sequence. On the other hand, the branching portion of the CPC part to the next part is stored as the information in the CPC part. Using this information, the serial bus host controller 10A can comprehend the shape and the next position of the CPC part or the shape of the part coupled to this position. By the serial bus host controller 10A delivering the data to the virtual robot 10B, the latter can automatically acquire the information as to which shape the robot itself has, what function it has and where it is present.

In the robot device configured as shown in FIGS. 1 and 2, there is provided a CPC unit 20 in which the CPC units 21A, 21B, . . . as physical component elements are combined or branched in the tree structure. These CPC units 21A, 21B, . . . can be driving-controlled by the agent model unit 10 adapted to acquire the information of the CPC units 21A, 21B, . . . and the sequence over the serial bus.

The connection information CONNECTi of elementary structures PARTj making up the robot parts CPCi of the robot device described above is hereinafter explained.

Figure 3:
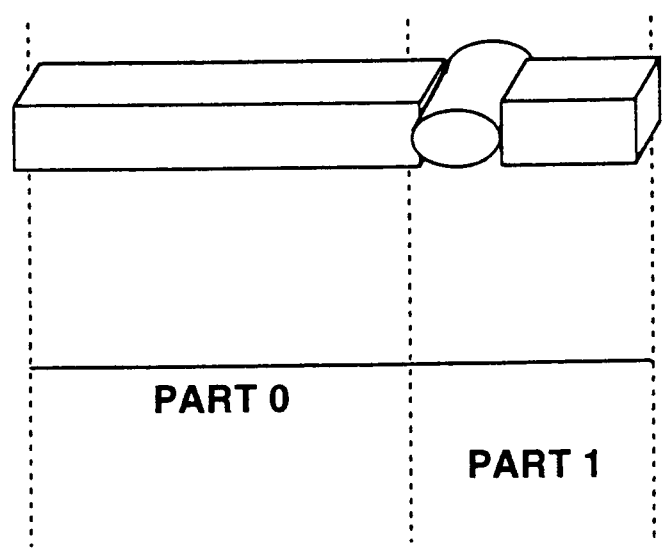
FIG. 3 is a schematic view showing robot parts making up the robot apparatus embodying the present invention and its elementary structures.

FIG. 3 shows a simple robot part CPCi and its elementary structures PART0, PART1. In this robot part CPCi, the elementary structure PART0 has a connection point close to the host of the serial bus as a beginning point, and the elementary structure PART1 is coupled to the terminal point of the elementary structure PART0. The elementary structure PART1 has a structural system having freedom of rotation at its beginning point and a portion at its terminal portion for connection to the next part. The connection information CONNECTi of the elementary structure PARTj constituting the robot part CPCi of the above-described structure is represented by a symbol "-" representing serial connection to the directly previous structure and hence is defined as CONNECTi=(PART0-PART1).

Figure 4:
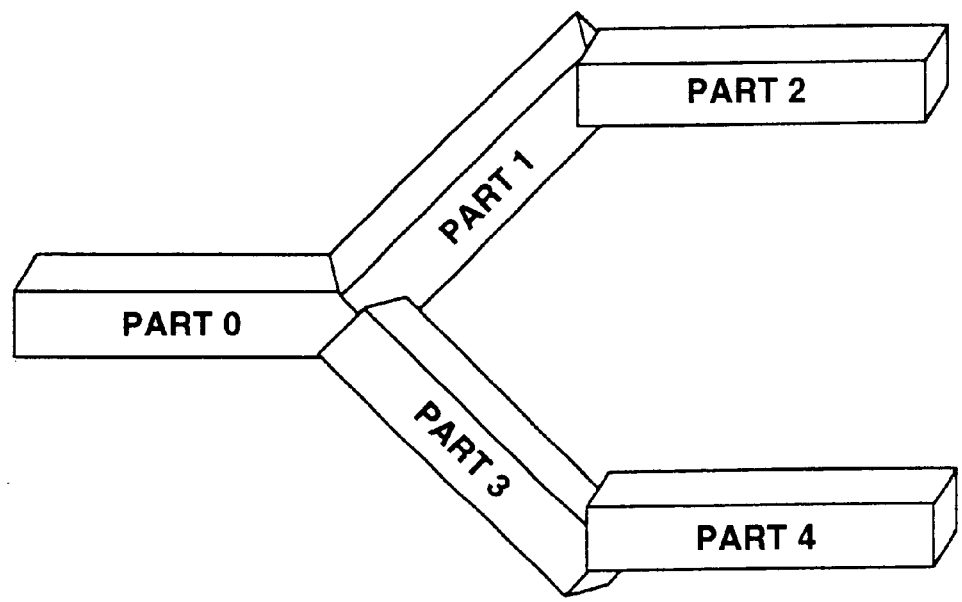
FIG. 4 is a schematic view showing a branched robot part and its elementary structures.
Figure 4:
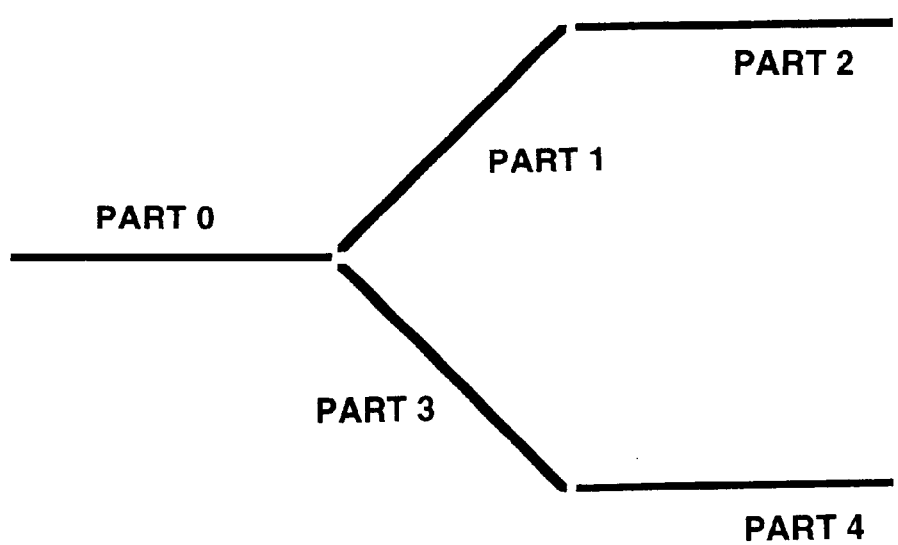

FIG. 4 shows a branched robot part CPCi obtained on connecting the elementary structures PART0 to PART4. For simplicity, the elementary structures are simply shown coupled to each other without specifically showing the rotational driving system. The connection information CONNECTi in this case is defined by a form of CONNECTi={PART0-PART1-PART2:2PART3-PART4}.

It is noted that the symbol ":2" has the meaning of directly to an elementary structure two structures at back of the current structure (herein the elementary structure PART0). If the index i of the PARTi is defined as 0, 1, 2, ..., J-1, in the arraying order, where J is the number of elementary structures, then CONNECTi={--;2}.

In general, the connection information CONNECTi can be represented by the symbol "-" and the symbol ":n". By defining the representation of the connection of the elementary structures, parts having various shapes or functions can be represented.

The shape information SHAPEi of the elementary structures is hereinafter explained.

In the embodiments of the present invention, the skeletonic representation shown in FIGS. 3 and 4 is adopted as the most fundamental representation. The information required in this skeletonic representation in general includes the information as to how rotation is to occur at the connection point of the elementary structures and the information as to the length of the elementary structures. These two items of the information are represented herein as a transformation matrix $_jR_i$ and the vector $_jp_i$.

Specifically, the elementary structure PARTj has its length and direction represented by a vector $_jp_i$ having the terminal point of the directly previous elementary structure to be coupled as its beginning point and also having the point of connection to the next elementary structure as its terminal point. It is assumed that the vector $_jp_i$ is represented by a local coordinate system $_j\Sigma_i$ defined in the elementary structure PARTj, and that the local coordinate system $_j93_i$ is defined by the terminal point of the previous elementary structure. The reason is that if, in case of connection of robot parts CPCi, the robot part CPCi-1 and the robot part CPCi are coupled to each other, since the direction of the connection plane is fixed at the terminal point of the robot part CPCi-1, a transformation matrix needs to be defined in the robot part CPCi-1, so that it is possible to use a presupposition that the coordinate transformation at the beginning point of the robot part CPCi uses the transformation by the transformation matrix defined at the terminal point of the robot part CPCi-1. Therefore, the inside of the robot part is represented accordingly.

Usually, a rotatable or translatable mechanical system is built at the beginning point of the elementary structure PARTi. However, it is necessary to represent the rotary axis or the axis of translation. By aligning the positive direction of these movements with the Z-axis direction as determined by the transformation matrix, it is possible to reduce the information volume, as will be explained subsequently.

Figure 5:
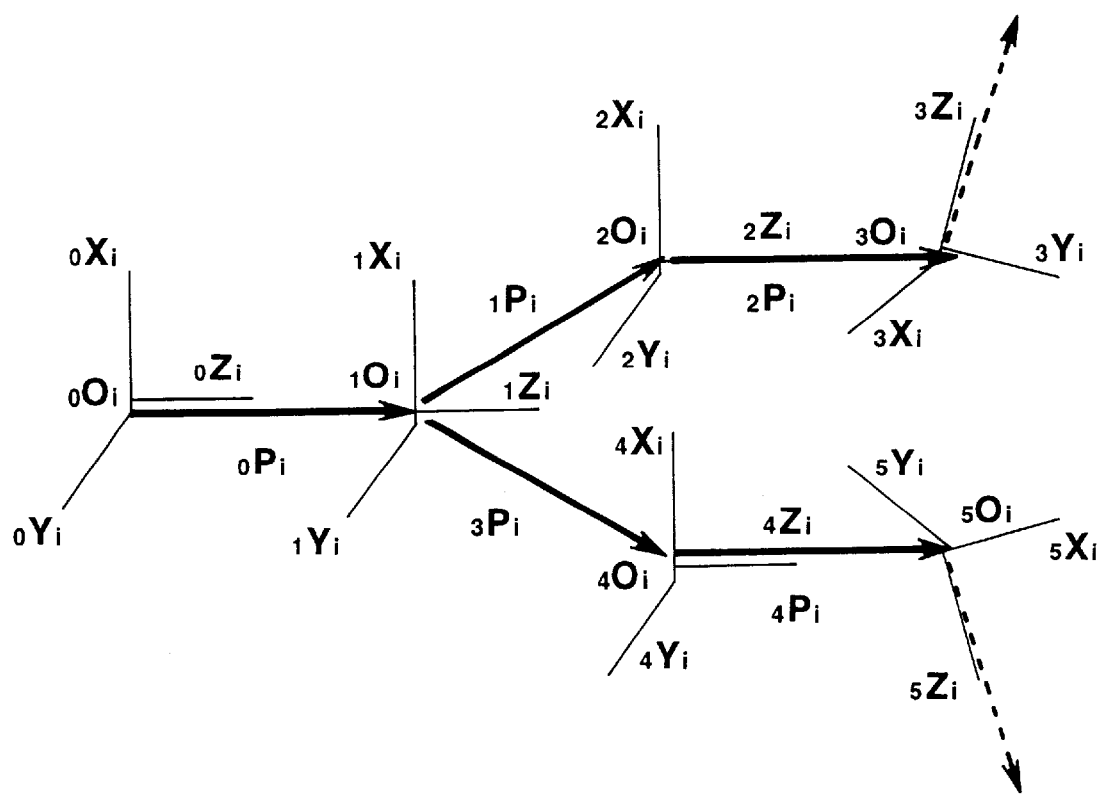
FIG. 5 shows skeletonic representation of elementary structures of the robot parts shown in FIG. 4.

FIG. 5 shows the skeletonic representation of the elementary structures PART0 to PART4 of the robot part CPCi shown in FIG. 4.

It is noted that the elementary structure PART0 and its coordinate system $_j\Sigma_i$ ($_jO_i$-$_jX_i$, $_jY_i$, $_jZ_i$) (j=0) is the same as the coordinate system of the terminal point of a previous part coupled to the origin $_jO_i$. In the previous example, the transformation matrix $_jR_i$ (j=1,2,4) is equivalent to the unit matrix and is not subjected to rotational transformation. However, the transformation matrix $_jR_i$ (j=3,5) defined by the terminal point of $_jp_i$ (j=2,4), and which is the connection point to the next robot part, is subjected to rotational transformation.

Therefore, the shape information SHAPEi is generally given by:

SHAPEi={($_jp_i$, $_{j+1}R_i$), (j=0, ,, J-1).

It is noted that the number of j is matched to the number of the elementary structure determined by the connection information CONNECTi. The transformation matrix $_{j+1}R_i$ is a 3×3 matrix and represented by nine elements. However, in view of constraint in representing the coordinate rotation, the transformation matrix can be represented in a known manner by three perimeters. Therefore, the shape information of the elementary structure of the skeletonic representation is constituted by three elements of the vector $_jp_i$ and the three elements necessary to generate the transformation matrix, totalling at six elements.

The dynamic information DYNi, required for setting the equation of motion, is hereinafter explained.

In the textbook for the robot control theory, the theory of robot control as a problem of the reverse kinetics and forward kinetics of the robot is shown.

As a method for deriving the equation of motion in the problems of reverse kinetics and forward kinetics, there are known a method of directing attention to various energy functions proper to the robot and substituting these functions into the Lagrange equation an a method of directing attention to equilibrium, action and reaction of the forces acting on robot links and the moment and finding the equation of motion of the entire robot using the Newton's equation of motion and the Euler's equation of motion. At any rate, the required information DYNi is the position vector $_js_i$ of the center of mass $_jG_i$ represented by the local coordinate system $_j\Sigma_i$ of the respective elementary structures iPARTj and the matric of inertia $_jI_i$ centered about the mass $_jm_i$ and $_jG_i$, in addition to the above-described connection information CONNECTi and the shape information SHAPEi. Specifically, DYNi={$_js_i$, $_jm_i$, $_jI_i$)}.

It is also necessary to show which movement is possible with the point of origin of the elementary structure, specifically, whether the motion of the point of origin is rotation, translation or immobilization. In case of rotation or translation, it is necessary to give the axis of rotation or the axis of translation. The motion possible at the point of origin is represented as jMOTMODEi. This jMOTMODEi, which is a magnitude concerning the equation of motion, may also be conceived as the functional information. In the present embodiment, jMOTMODEi is contained in the functional information jFUNCi.

The functional information jFUNCi represents the type of the functional element present at the beginning point of PARTj and jMOTMODEi and further represents its characteristics. The type of the functional elements are managed by pre-defined numbers, such as by FUNCID=0 and FUNCID=1 for an actuator and for an acoustic output device, respectively.

On the other hand, the characteristics of the functional elements are described by the format of the characteristic data defined from one functional element to another. If the functional element is not an actuator, its beginning point is fixed, so that jMOTMODEi is thought to be a part of the characteristic information of the actuator.

It is noted that jMOTMODEi is basically the combination of rotation and translation or is fixed. As for the degree of freedom of rotation, up to the maximum of three axes for rotation (under assuming a rectangular coordinate system) can be set. Similarly, up to the maximum of three axes for translation can be set. In the absence of the corresponding axis setting, the axial degree of freedom is assumed to be fixed. That is, $$jMOTMODEi=\{(_jr0_i, _jr1_i, _jr2_i), (_jpa0_i, _jpa1_i, _jpa2_i)\}.$$

In general, these rotational axis jrki and the translational axis jpaki (k=0,1,2) are vectors represented by the coordinate system pf the elementary structures PARTj. If these are all 0 vectors, the vector represents immobilization.

Alternatively, representation such as $$JMOTMODEi=\{(_jr0_i, , ), (, , )\}$$

may be defined to indicate that there is only one degree of freedom.

Among other possible actuator characteristics than this jMOTMODEi are a rotational speed and torque characteristics. In the present embodiment, however, only this jMOTMODEi is considered as the information on actuator characteristics.

FUNCID=0 represents a sheer connection devoid of any function.

FUNCID=1 denotes an actuator the information for which includes the sampling frequency Fs, quantization number Q and jMOTMODEi.

FUNCID=2 denotes an acoustic output device the information for which includes the sampling frequency Fs and quantization number Q.

FUNCID=3 denotes picture outputting device the information for which includes the number of pixels in the transverse direction IMX, the number of pixels in the longitudinal direction IMY, frame/field ratio F, picture format Form and the quantization numbers Q1, Q2, Q3.

FUNCID=4 denotes an angular sensor the information for which includes the sampling frequency Fs, quantization number Q and the range of angular detection Min, Max.

FUNCID=5 denotes an acoustic sensor the information for which includes the sampling frequency Fs, quantization number Q and the number of channels CH.

FUNCID=6 denotes a picture sensor the information for which includes the number of pixels in the transverse direction IMX, the number of pixels in the longitudinal direction IMY, frame/field ratio F, picture format Form and the quantization numbers Q1, Q2, Q3. Form=0 indicates YU/YV, in which Q1, Q2 and Q3 denote the quantization numbers of Y, V and U, respectively. Also, Form=0 indicates RGB in which Q1, Q2 and Q3 denote the quantization numbers of R, G and B, respectively.

FUNCID=7 denotes a contact sensor for detecting the contact force, the information for which includes the sampling frequency Fs, quantization number Q, detection range Min, Max and the effective channel Index (0/1, 0/1, 0/1).

FUNCID=8 denotes an acceleration sensor, the information for which includes the sampling frequency Fs, quantization number Q, detection range Min, Max and the effective channel index (0/1, 0/1, 0/1).

FUNCID=9 denotes an angular acceleration sensor, the information for which includes the sampling frequency Fs, quantization number Q, detection range Min, Max and the effective channel index (0/1, 0/1, 0/1).

Meanwhile, index in the contact sensor FUNCID=7, acceleration sensor FUNCID=8 and the angular acceleration sensor FUNCID=9 denote axial detectability in the (X, Y, Z) directions. 0 and 1 denote the absence and presence of the detection element in the pertinent direction, respectively. It is therefore necessary with these sensors to match the detection direction to the local coordinate (X, Y, Z) by the transformation matrix.

Thus, it can be known by FUNCID and the information on characteristics (description data) defined accordingly which function is affixed to which portion of the robot.

The functional information jFUNCi is represented by jFUNCi={(FUNCID), {description data}}.

To summarize, if it is assumed in the present embodiment that the parts CPCi are robot parts making up a robot and are composed of J elementary structures PARTj, and the connection information thereof, and the connection information is CONNECTi, the shape information of the elementary structures PARTj is jSHAPEi, the dynamic information of the elementary structures PARTj is jDYNi and the functional information of the elementary structures PARTj is jFUNCi, then (i) the connecting information CONNECTi is represented by a symbol "-" specifying serial connection to a previous elementary structure and a symbol ";n" specifying connection to the elementary structure n elementary structures ahead.

(ii) As for the shape information jSHAPEi, what may be termed the bone of the elementary structures PARTj is represented by straight lines by a vector $_jp_i$, and the coordinate transformation to the next elementary structure at the terminal point of iPARTj is given by the transformation matrix $_jR_i$.

(iii) The dynamic information jDYNi is comprised of an inertia matrix $_jI_i$, centered about mass $_jm_i$, $_jG_i$ and the vector $_js_i$ to the center of mass $_jG_i$ of iPARTj represented by the coordinate system $_j\Sigma_i$ of iPARTj.

(iv) The functional information jFUNCi is represented by index FUNCID specifying that the function is that of the actuator or various sensors and data representing their characteristics. In particular, in an actuator, the characteristics are represented by jMOTMODEi defining mobility at the starting point of PARTj. It is noted that jMOTMODEi gives three rotational axis vectors and three translational axis vectors.

By the above data, parameters and the functional information, although simple, are given, that are required for skeletonic representation of parts and the equation of motion.

Although the above relates to the logical information format, no reference is made to a bit array on the memory or a bit array for transmission over a serial bus. The simplest of the information formats on the physical format level is such a format in which values defined by the logical format or symbols such as {, -, :, are recorded by the ASCII format and values are represented by integers 0, 1, fixed decimal point notation or a floating decimal point notation such as 3.14 or 3.14E-10, are directly represented by the ASCII format byte-by-byte and transferred by LSB first byte-by-byte.

Although the connection information is represented in the present embodiment by symbols "-", ":n", other symbols may also be used. Among other known methods for representing the connecting information is a data structure representing the tree structure. It is also possible to give a definition by defining the set of beginning points and a set interconnecting a beginning point and an en point for each beginning point.

Also, in the present embodiment, description has been made to the effect that a function exists at the beginning point of the elementary structures PARTj. In an alternative description, the function may exist at the terminal point. It is also possible to define all functions at the terminal point and to use a 0-vector to re-define the function present at the initial point at the terminal point. It is also possible to use an expression which permits both the beginning and end points to have the functions.

Figure 6:
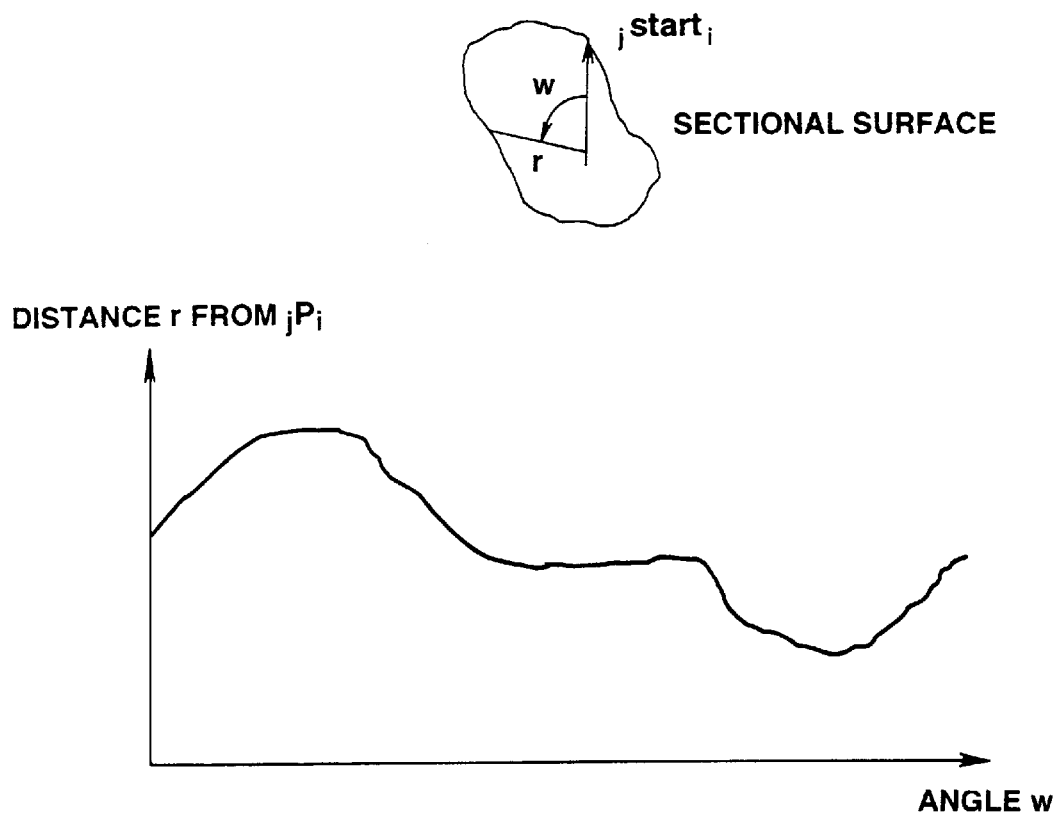
FIG. 6 shows another example of representation of the shape of the elementary structure.

In the present embodiment, the shape is given by the skeletonic representation. A parallelepiped may also be defined by adding a vector $_j\text{width}_i$ which gives the width of a part and a vector $_j\text{height}_i$ which gives its height to the vectir $_jp_i$ which gives the length of the part. There may also be a method in which a vector $_j\text{start}_i$ which gives the shape of a sectional plane normal to the vector $_jp_i$ as a start point and a function which gives a distance r from $_jp_i$ in the coordinate system having a positive angle $_w$ in the counterclockwise direction and data corresponding to compression of the function by a suitable method is had as representation. This is shown in FIG. 6 in which compression is by sampling at an interval of 10° and modulated by ADPCM.

Since the above data concerning the shape is voluminous in general, it is possible to give then from another medium instead of from the inside of the part by an index specifying the name of the producer and its part number.

Figure 7:
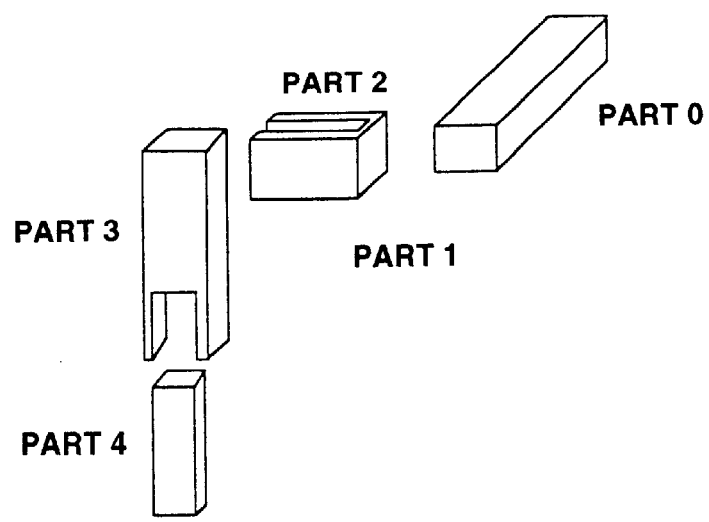
FIG. 7 shows three-articulation lrg parts as an specified example of a robot part.

FIG. 7 shows an illustrative robot part defined as described above.

Figure 8:
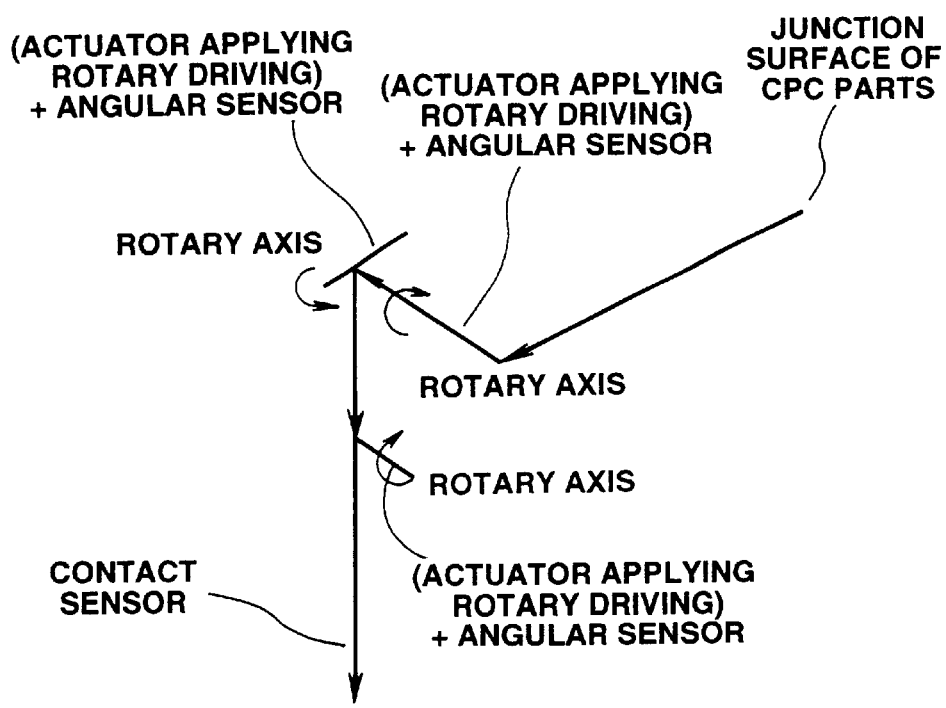
FIG. 8 shows the link structure of the leg components.

The present example is directed t a leg of a robot obtained on interconnecting elementary structures PART0 to PART 4 and has three articulations with a contact sensor at the tip end. This robot part can be represented by five links, as shown in FIG. 8.

The connection information CONNECTi of this robot part is

CONNECT={0-1-2-3-} while the shape information SHAPE is $$_0p = (0, 0, 60), _1R = \begin{bmatrix} 1, & 0, & 0 \\ 0, & 0, & 1 \\ 0, & -1, & 0 \end{bmatrix}$$

$$_1p = (0, 16, 0), _2R = \begin{bmatrix} 1, & 0, & 0 \\ 0, & 1, & 0 \\ 0, & 0, & 1 \end{bmatrix}$$

$$_2p = (0, 0, 18.5), _3R = \begin{bmatrix} 0, & 0, & -1 \\ 0, & 1, & 0 \\ 1, & 0, & 0 \end{bmatrix}$$

-continued $$_3p = (0, 0, 55), _4R = \begin{bmatrix} 1, & 0, & 0 \\ 0, & 1, & 0 \\ 0, & 0, & 1 \end{bmatrix}$$

$$_4p = (0, 0, 47.5), _5R = \begin{bmatrix} 1, & 0, & 0 \\ 0, & 1, & 0 \\ 0, & 0, & 1 \end{bmatrix}$$

The dynamic information jDYNi is $_0S=(0, 0, 35)(m, m),_0 m=128(g)$ $_0I=[59477, 59477, 14421](g \cdot mm^2)$ $_1S=(0, 0, 14.5)_1 m=0.6$ $_1I=[4.2, 4.2, 7.5]$ $_2S=(0, 0, 6),_2 m=37$ $_2I=[9085, 6476, 1151]$ $_3S=(0, 0, 21.35),_3 m=96$ $_3I=[32437, 32878, 11268]$ $_4S=(0, 0, 21.25),_4 m=36$ $_4I=[9037, 9037, 1536]$ The functional information jFUNCi is $_0\text{FUNC}=\{1D=0\}$ $_1FUNC = \{1D = 1, Fs = 8000, Q = 10, _2MOTMODE = \{([0, 0, 1],), (, ,)\},$ 1D=5, Fs=8000, Q=10, (−120, +120)}

$_2FUNC = \{1D = 1, Fs = 8000, Q = 10, _2MOTMODE = \{([0, -1, 0],), (, ,)\},$

1D=5, Fs=8000, Q=10, (−120, +120)}

$_3FUNC = \{1D = 1, Fs = 8000, Q = 10, _2MOTMODE = \{([-1, 0, 0],), (, ,)\},$

1D=5, Fs=8000, Q=10, (−120, +120)}

$_4\text{FUNC}=\{1D=7, Fs=8000, Q=1, (,0), (0, 0, 1)\}$.

What is claimed is:

1. A method for describing a structure of a robot comprising:
   a step of resolving a controllable and physically moveable robot part including a configurable physical component CPCi into J elementary structures PARTj; and
   a step of specifying the robot part, including information about a mass/weight of the part, in a sequence of the elementary structures by three dimensional connection information CONNECTi and shape information jSHAPEi made up of a vector $_jP_i$ and a transformation matrix $_jp_i$, which is at least a three by three matrix.

2. The method according to claim 1 wherein the initial coordinate point of the next part is given by the terminal point of a connection plane of the part.

3. A robot apparatus comprising:
overall control means; and
a plurality of parts configurable physical components CPC containing electronic parts including at least one of an actuator and a sensor for measuring a pre-set physical quantity;
the overall control means doing overall recognition and control by shape information for determining a shape of the parts, motion information necessary for stating a motion of the parts, information on characteristics of the electronic parts housed in the parts, and connection information specifying a connection status of the parts, wherein
parts CPCi are composed of J elementary structures PARTj and the connection information thereof, the connection information is CONNECTi, the shape information of the elementary structures PARTj is jSHAPEi, dynamic information of the elementary structures PARTj is jDYNi and functional information of the elementary structures PARTj is jFUNCi,
the connecting information CONNECTi is represented by a symbol "-" specifying serial connection to a previous elementary structure and a symbol ";n" specifying connection to the elementary structure n elementary structures before,
the shape information jSHAPEi is represented by a vector $_jP_i$ of a straight line and coordinate transformation to a next elementary structure at an end point of iPARTj is given by a transformation matrix $_jR_j$,
the dynamic information jDYNi is comprised of a vector $_js_i$ to a center of mass $_jG_i$ of iPARTj represented by a coordinate system $_j\Sigma_i$ of iPARTj, an inertia matrix $_jI_i$ centered about mass $_jm_i$, $_jG_i$ and information $_ja_i$ which gives a direction of motion at a beginning point of iPARTj, in which a torque and the direction in which is generated the function positioned at the beginning point is accorded by the function information jFUNCi of the elementary structures PARTj, and
the functional information jFUNCi is the connection information specifying the connection state of parts.

4. A robot part comprising:
storage means for storing three dimensional information on physical characteristics of a first part, including information about a mass/weight of the first part, which is controllable and physically moveable and connected in a sequence to a second part; and
means for retrieving the information stored in said storage means to control movement of the first part based on the connection sequence and independent of a control of the movement of the second part.

5. The robot part according to claim 4 further comprising control means.

6. The robot part according to claim 4 wherein said information is the shape information determining the shape of parts.

7. The robot part according to claim 4 wherein said information is the motion information necessary to describe the motion of parts.

8. The robot part according to claim 4 wherein said information is the functional information of parts housed in said parts.

9. The robot part according to claim 4 wherein said information is the connection information specifying the connection state of the parts.

10. The robot part according to claim 7 wherein said information is an index stating that the function is that of an actuator or a sensor and the information by data representing the characteristics.

11. A method for describing a structure of a robot comprising:
resolving a controllable and physically moveable robot part into elementary structures; and
specifying the part by specifying connection information via a three by three matrix, information about a mass/weight of the part, and shape information, the shape information including at least six elementary structures, information concerning a length of an elementary structure and information concerning how to move the structure to connect to an end of another elementary structure.

12. A robot apparatus comprising:
a means for overall control; and
a plurality of controllable and physically moveable parts housing an electronic component for measuring a pre-set physical quantity; wherein
the overall control means performs overall recognition and control using, for each part, shape information, motion information, information concerning a housed electronic component, and connection information;
the parts include an elementary structure; and
the elementary structure includes connection information, shape information, dynamic information and functional information, such that the connection information includes a serial connection to a previous elementary structure, the shape information includes a straight line vector and a transformation matrix, which is at least a three by three matrix, having information concerning how to move the structure connected to an end of the previous elementary structure, the movement being independently controllable from a movement of the previous structure, the dynamic information includes inertia information for the structure, and the functional information includes operation information on the housed electronic component.

13. A robot apparatus comprising:
a hub;
controllable and physically moveable component parts each having an address that includes a reference to the hub;
a bus controller that determines a connection sequence that includes a matrix which is at least a three by three matrix by serially associating the addresses of the component parts using the matrix; and
a controller that uses information about a mass/weight of at least one of the component parts to control the parts so that movement of a first one of the parts is controllable independently of a second one of the parts to which the first part is connected using the connection sequence.

14. The robot apparatus of claim 13, wherein the component parts each further comprise:
shape information that includes a straight line vector;
a transformation matrix having information concerning how to move the component parts; and
dynamic information including inertia information for the component parts.

15. The robot apparatus of claim 14, which includes a detector that detects a form for the component parts based on the connection sequence, the shape information and the dynamic information.

16. A robot apparatus comprising:
a robot body;
a plurality of controllable and physically moveable parts connected to the robot body;
a memory device that stores
information about a mass/weight of at least one of the parts,
information concerning a connection state of the parts, and
information concerning at least one of a shape of the body and a shape of the parts using a vector and a transformation matrix, which is at least a three by three matrix; and
a processor that operates with the memory device to control the moveable parts so that movement of a first one of the parts is controllable independently of a second one of the parts to which the first part is connected.

17. The robot apparatus of claim 16, wherein the memory device stores inertia information for the component parts.

18. A robot apparatus comprising:
a robot body;
a plurality of controllable and physically moveable robot parts connected to the robot body;
a plurality of symbols each representing one of the robot parts;
a plurality of serial connection symbols each representing a serial connection between two parts;
a branch connection symbol that represents a branch connection among the parts; and
a controller that controls movement of the robot parts using the serial connection symbols, mass/weight information for at least one of the parts and the branch connection symbol.

* * * * *